United States Patent [19]

Kremer et al.

[11] Patent Number: 5,690,154
[45] Date of Patent: Nov. 25, 1997

[54] FILLING SYSTEM FOR ROBOT-CAPABLE FILLING OF A VEHICLE WITH FUEL

[75] Inventors: Adolf Kremer, Remseck; Reinhard Steinkaemper, Winnenden; Axel Fischer, Obernburg; Tilo Schumann, Dieburg, all of Germany

[73] Assignee: Mercedes-Benz AG, Stuttgart, Germany

[21] Appl. No.: 706,568

[22] Filed: Sep. 5, 1996

[30]    Foreign Application Priority Data

Sep. 5, 1995 [DE] Germany ............... 195 32 774.8

[51] Int. Cl.⁶ .................................................. B60K 15/00
[52] U.S. Cl. ........................ 141/348; 141/312; 141/346; 141/384; 141/386
[58] Field of Search ............................ 141/312, 346, 141/348–350, 98, 368, 382–386; 220/86.1, 86.2; 901/6

[56]    References Cited

U.S. PATENT DOCUMENTS

| | | | |
|---|---|---|---|
| 3,168,125 | 2/1965 | Rosell | 141/346 |
| 3,473,569 | 10/1969 | Guertin et al. | 141/346 |
| 3,513,887 | 5/1970 | Limandri | 141/346 |
| 3,587,678 | 6/1971 | Hieber et al. | 141/346 |
| 3,976,100 | 8/1976 | Souslin | 141/346 |
| 4,567,924 | 2/1986 | Brown | 141/346 |
| 4,881,581 | 11/1989 | Hollerback | 141/98 |
| 5,238,034 | 8/1993 | Corfiten | 141/348 |
| 5,301,723 | 4/1994 | Goode | 141/346 |
| 5,322,100 | 6/1994 | Buechler et al. | 141/312 |
| 5,435,358 | 7/1995 | Kempka et al. | 141/312 |
| 5,485,871 | 1/1996 | Romanek et al. | 141/312 |

FOREIGN PATENT DOCUMENTS 0 612 639   8/1994   European Pat. Off. .

*Primary Examiner*—J. Casimer Jacyna
*Attorney, Agent, or Firm*—Evenson, McKeown, Edwards & Lenahan, P.L.L.C.

[57]    ABSTRACT

A filling system for robot-capable filling of a vehicle with fuel has a filler nozzle and a tank filler neck on which a docking extension provided with a central opening is mounted on the filling side. The extension is rotatable by an upper section around the axis of symmetry for opening and closing a tank closure. The filler nozzle is dockable by its end on an outlet side, forming a positive connection between the filler nozzle and the docking extension, with positive elements in the form of teeth distributed around its circumference. The teeth have a hub section and interlock with one another positively when the filler nozzle is ready for filling. In order to achieve functionally reliable docking of the filler nozzle on the filler neck of the vehicle fuel tank and to permit rapid undocking of the filler nozzle from the filler extension, a locking body, urged radially outward by a pretensioning spring, is provided on the outlet side of the filler nozzle. The locking body is guidable relative to an upwardly adjacent positive element of the filler nozzle along a guide path that runs in the circumferential direction, and is inserted completely into the filler nozzle by rotating the filler nozzle at one end of the guide path. The body also projects radially out of the filler nozzle at the other end in such fashion that its bevelled surface abuts underneath the matching positive element of the docking extension beneath which it grips.

19 Claims, 7 Drawing Sheets

FILLING SYSTEM FOR ROBOT-CAPABLE FILLING OF A VEHICLE WITH FUEL

BACKGROUND AND SUMMARY OF THE INVENTION

The invention relates to a filling system for robot-capable filling of motor vehicles with fuel and, more particularly, to a filling system having a filler nozzle, a filler neck, and a docking extension provided with a central opening. The docking extension is mounted on the filling side and is rotatable by an upper section around the axis of symmetry for the opening and closing process of a tank closure. The filler nozzle is dockable in the extension, with its outlet end forming a positive connection between the filler nozzle and the docking extension. The connection is made using positive elements distributed around its circumference like the teeth of a hub section which mesh with one another positively when the filler nozzle is ready for the filling operation.

A filling system of the above-mentioned type is known from European patent document EP 0 612 639 A1. The system includes a robot-guided filler nozzle and a docking extension mounted on a closure for the tank filler neck of a motor vehicle. The extension is made in the form of a hollow cylinder and has internal teeth into which external teeth formed circumferentially on the outlet end of the filling tube of the filler nozzle can positively engage when docking, so that the closure can be opened by rotating the docking extension via the filler nozzle to ensure slip-proof retention of the filler nozzle on the motor vehicle in the docked state. If a vehicle occupant gets out of the vehicle during the filling process, rocking movements occur in the vehicle that result in separation of the two sets of teeth and thus can lead to a malfunction in the filling process.

The goal of the invention is to improve the known filling system such that malfunctions of the filling process as a result of movements of the docking extension caused by the vehicle can be avoided.

The goal is achieved according to the invention by a filler nozzle, a filler neck, and a docking extension provided with a central opening. The docking extension is mounted on the filling side and is rotatable by an upper section around the axis of symmetry for the opening and closing process of a tank closure. The filler nozzle is dockable in the extension, with its outlet end forming a positive connection between the filler nozzle and the docking extension. The connection is made using positive elements distributed around its circumference like the teeth of a hub section which mesh with one another positively when the filler nozzle is ready for the filling operation. Locking bodies are mounted on the filler nozzle. The bodies are radially movable but fixed axially and circumferentially. The bodies, when urged radially outward, grip positively beneath a circumferential bead on the docking extension, thus securing the filler nozzle axially. The bodies further are movable into a radially retracted position when the filler nozzle is docked and undocked.

As a result of the locking body gripping beneath the bead provided on the docking extension, it is an advantage of the present invention that secure locking of the filler nozzle to the filler neck is effected in the axial direction. In a simple fashion and without using any aids engaging from the outside, this prevents an undesired axial uncoupling of the filler nozzle from the filler neck during rocking movements of the motor vehicle, thus producing a functionally reliable coupling.

In addition, the invention offers a compact and structurally simple solution for a filling system, since actuating components for locking, which are guided in the opening of the filler nozzle and thus constrict its cross section, are absent. In addition, there are no other structural limitations placed on the area of the tank cavity which in any event is already very structurally restricted.

In addition, for an unimpeded docking process, it is advantageous for the locking bodies to be completely retracted inside the filler nozzle and hence offer no resistance to the axial movement of the filler nozzle at the docking extension. As a result of the bevel on the top of the locking body and the bevel of the positive element on the docking extension side that abuts its bevel, the locking bodies, in the event of an emergency undocking, in other words when a certain axial locking force is exceeded, deflect radially along the bevel opposite to the suitably dimensioned spring force of the pretensioning springs. This is done so that the filler nozzle can slide rapidly out of the docking extension without having to be rotated first.

Other objects, advantages and novel features of the present invention will become apparent from the following detailed description of the invention when considered in conjunction with the accompanying drawings.

DETAILED DESCRIPTION OF THE DRAWINGS

Figure 1:
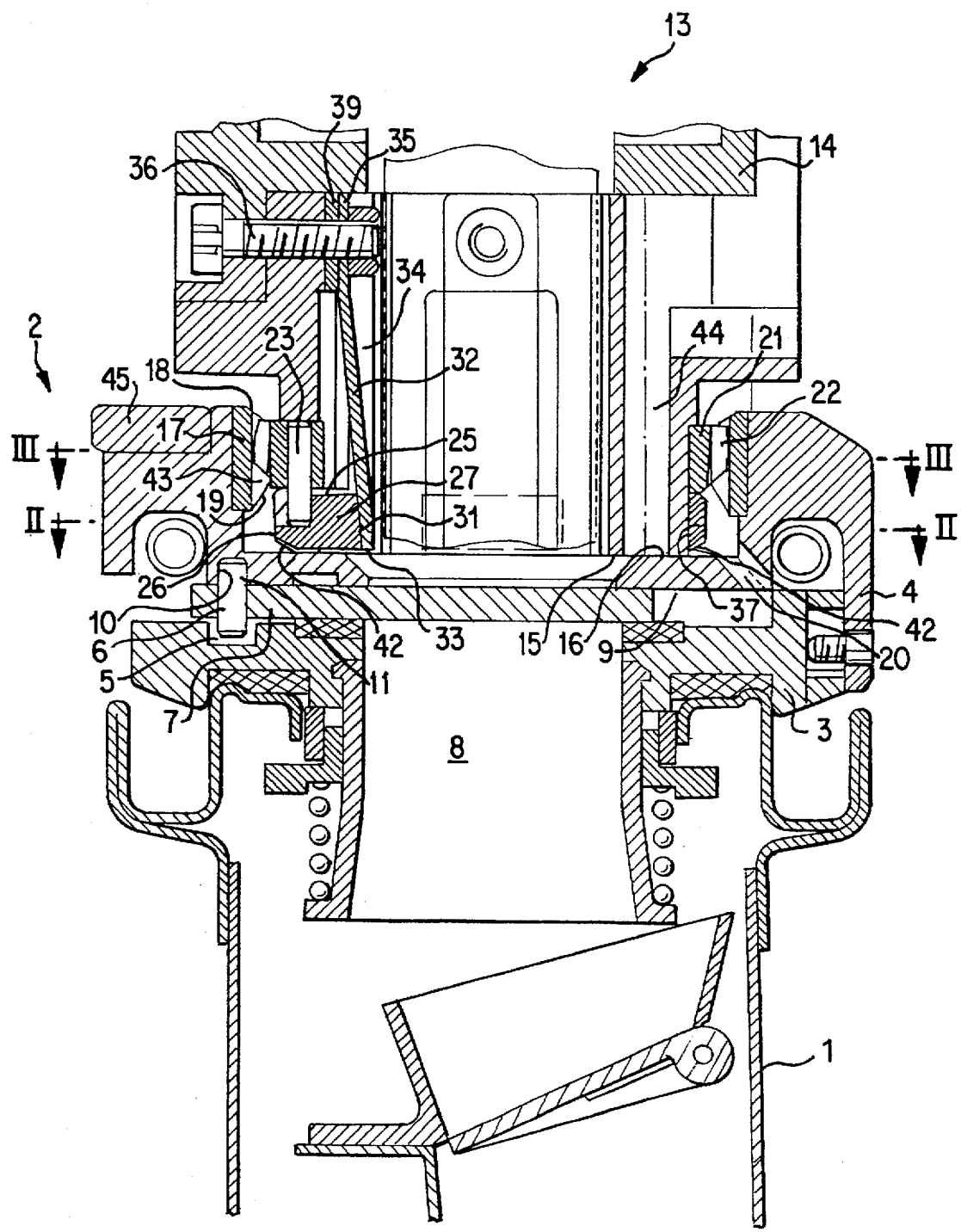
FIG. 1 shows part of the filling system according to the invention in a lateral lengthwise section, with a locking body provided at the lower end of the filler nozzle, into which body a guide path is machined, and with a guide pin rigidly fastened to teeth that form the positive element of the filler nozzle in the unlocked docking position of the filler nozzle.

FIG. 1 shows a filler neck 1 of a fuel tank of a motor vehicle, sealed by a cap 2 screwed onto it with a bayonet type of connection. Cap 2 consists essentially of two annular bodies 3, 4. The cap 2 is screwed onto the filler neck 1 with the annular body 3. At the top of annular body 3, a vertical rotational axis (not visible in the drawing) is provided for a swivel slide 7 that is horizontally pivotable and permanently attached to the axis. The slide 7 closes a central inlet channel 8 of annular body 3 in a sealing fashion. Annular body 4 is rotatably mounted on the top of annular body 3 to turn around the axis of said body 3, and has on its underside 9, near the edge, a receptacle 10 into which a drive pin 6 for swivel slide 7 engages with its upper end 11 in a press fit. Drive pin 6, via the rotation of annular body 4, moves swivel slide 7 in the circumferential direction from an open into a closed position and vice versa, depending on the direction of rotation of annular body 4. The drive pin 6 is guided inside a radial guide path machined in swivel slide 7. The pin 6 slides at the top of annular body 3 in a slot 5 formed in the shape of an arc of a circle.

At the top of the annular body 4, there is a coaxial hollow cylindrical docking extension 12, into which a filler nozzle 13 of a filling robot having an end 14 on the outlet side, hereinafter called the "end effector," is inserted for filling. The filler nozzle 13 abuts top 16 of annular body 4 with its end 15 in the docking position. In the inner circumference of docking extension 12, circumferential teeth 17 with axial spacing from the top 16 of annular body 4 are provided, flanks 18, 19 of the teeth being beveled in the axial direction. Annular body 4 is traversed by a drainage channel 20 that runs diagonally outward, through which channel rain and condensation water can be guided out of the docking area to avoid corrosion.

A toothed ring 21 is mounted on the end effector 14. The ring 21 is rotatably mounted on the effector. The teeth of ring 21 are formed in three segments 22, arranged symmetrically with respect to one another in the circumferential direction and fitted with teeth that match teeth 17. The segments 22 are beveled on the underside, so that filling nozzle 13 can be centered in docking extension 12 during the docking movement of the filling nozzle 13 at the docking extension 12 as a result of the sliding of the beveled surfaces of flanks 18 of teeth 17 of docking extension 12 and of the segment teeth over one another.

Figure 2:
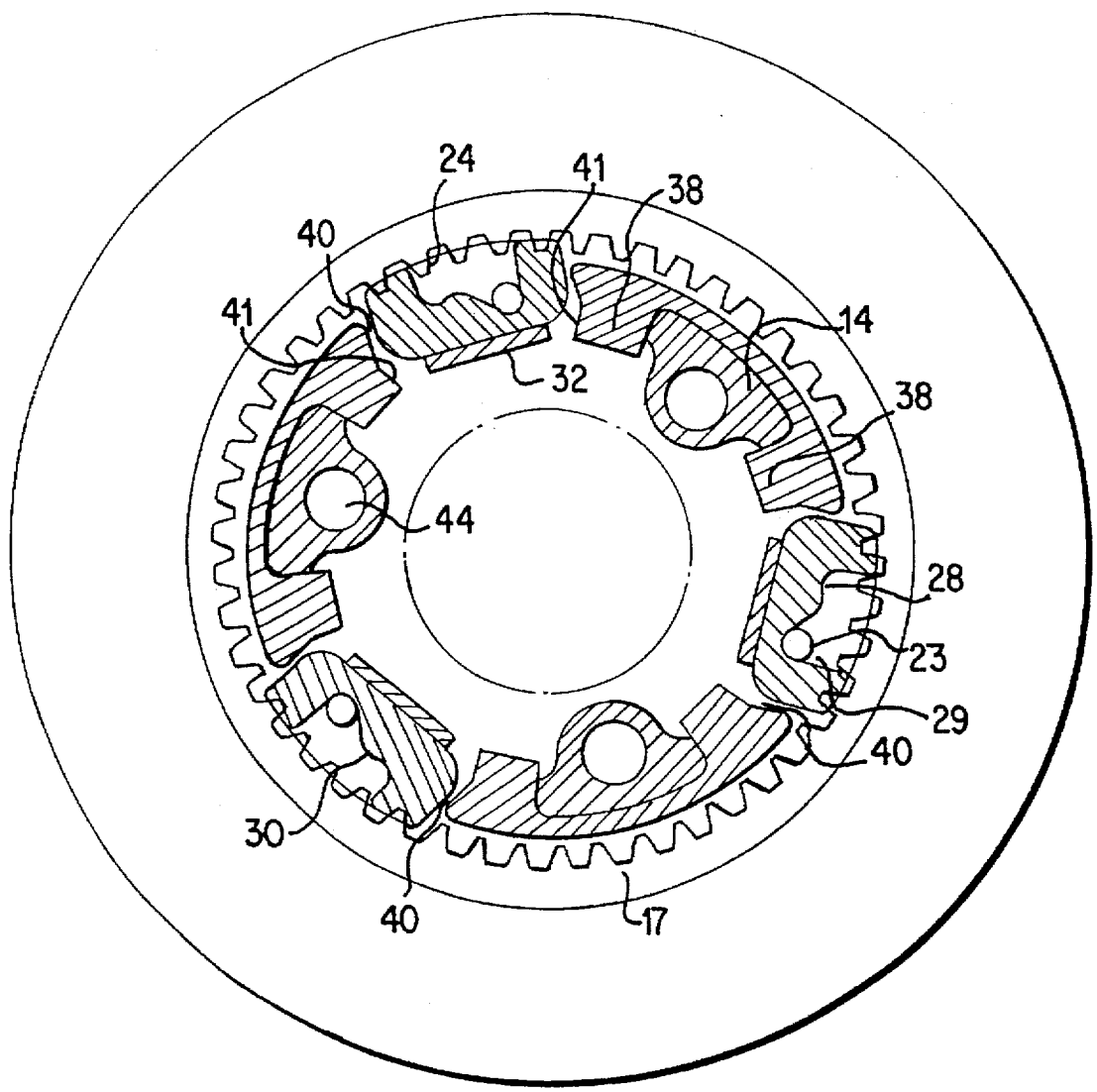
FIG. 2 is a top view of a cross section of the system in FIG. 1 in a section taken along line II—II in the locked docking position of the filler nozzle.
Figure 3:
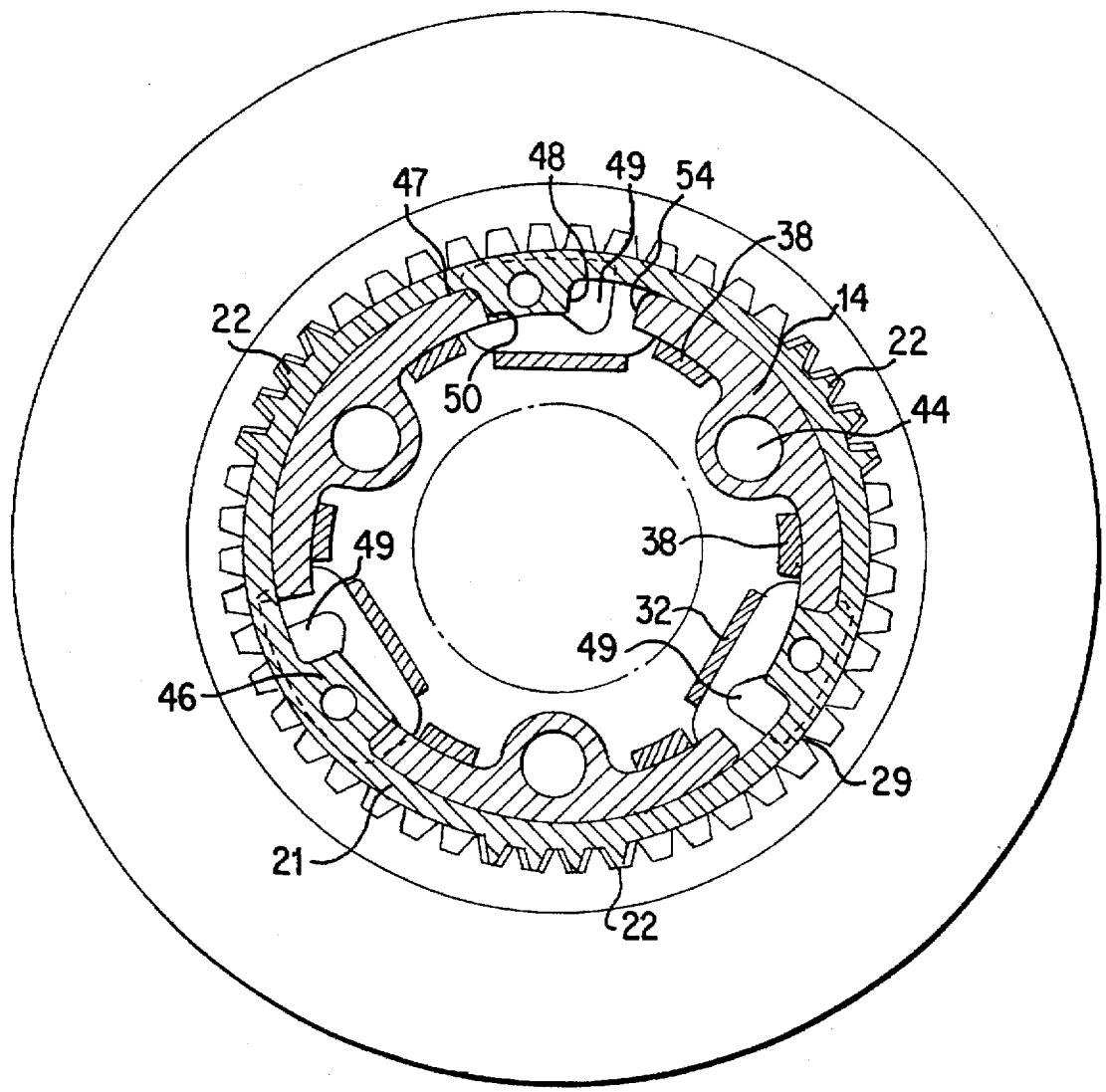
FIG. 3 is a top view of a cross section of the system in FIG. 1 in a section taken along line III—III in the unlocked docking position of the filler nozzle.

A guide pin 23 is held in toothed ring 21 by a press fit. The pin 23 projects vertically from the ring 21. Guide pin 23 projects into guide path 24 which is machined into surface 25 at an outer edge 26 of a locking body 27 in the shape of a hammer head. Two locked positions 28, 29 are provided in the guide path 24 which runs in the circumferential direction of the end effector 14, one of the locked positions, 28, being located radially further inward than the other locked position 29. From locked position 28, guide path 24 is bevelled to extend radially outward and end at locked position 29. The position 29 is located radially further inward relative to end point 30 of the bevelled surface (FIGS. 2 and 3). In locked position 29, as can be seen in FIG. 1, the locking body 27 is completely inserted in end effector 14.

A leaf spring 32 is fastened at a lower end 33 by gluing, soldering, or riveting to the inside 31 of the locking body 27 located opposite the outer edge 26 thereof. In this position, the lower end 23 is in the state in which it is pretensioned radially outward. Leaf spring 32 is located in an axial recess 34 of end effector 14 and is fastened to the end effector by a screw 36 at its end 35 facing away from the locking body 27. Each of the three leaf springs 32 arranged symmetrically in the circumferential direction is associated with a screw 36. This screw 36 is also used to secure a retaining sleeve 37 pushed onto the end effector 14 after the toothed ring 21. The retaining sleeve 37 abuts the ring 21 to retain it axially. Sleeve 37 has a plurality of tabs 38 to fasten it. The tabs project axially into recess 34 of end effector 14 and are each screwed at their upper end 39 by means of a screw 36 to the end effector 14. Sleeve 37, also in the vicinity of end 15 of end effector 14, has radial openings 40 that receive locking bodies 27 and fit flush with outer opening edge 41 in locked position 29. Retaining sleeve 37 and locking body 27 have chamfers 42 on end 15 of end effector 14. The chamfers 42 serve for initial centering of filler nozzle 13 when end effector 14 is introduced into docking extension 12.

On its outer edge 26, locking body 27 has a bevel 43 designed appropriately relative to the pitch of flanks 19 of teeth 17 of docking extension 12. End effector 14 also has three axial bores 44 to receive sensor optics. The bores are distributed symmetrically in the circumferential direction.

For manually opening and closing cap 2, a loop 45 is integrated into the circumference of docking extension 12 near its end. The loop 45 is pivotable around an axis that runs transversely with respect to the docking direction, so that by pivoting loop 45 through 90°, a handling position, possibly in a locked position, is reached in which cap 2 can be opened simply by rotating loop 45 in the circumferential direction. Loop 45 is spring-tensioned, with the spring pulling the loop 45 in the direction of its non-operating position at the circumference of docking extension 12.

As is also evident from FIG. 2, sleeve 37 fits over end effector 14 with its tabs 38 projecting radially inward from its circumference in the end area of said effector, providing a firm grip for sleeve 37 in this area of the end effector 14. Locking bodies 27 are then pushed out of their inserted positions and fit beneath teeth 17 of docking extension 12. The filler nozzle 13 is then axially locked to the extension. Guide pin 23 is then engaged in locked position 28, so that leaf spring 32 can push locking body 27 radially outward through opening 40 of sleeve 37.

FIG. 3 shows that the toothed ring 21 has a extension 46 that runs radially inward. The extension is located centrally between toothed segments 22 in the circumferential direction. Lateral flanks 47, 48 of extension 46 then form stops for the bell-shaped end effector 14. The effector has openings 49 for this purpose, into which openings the extension 46 projects. Openings 49 have a width at least equal to the length of guide path 24 in the circumferential direction. Flanks 47 abut opening edge 50 of opening 49 in locked position 28, while flanks 48 abut opening edge 54 in locked position 29. Although locked positions 28, 29 themselves form stops for toothed ring 21, there is the danger that twisting of the leaf springs 32 can result from excessive rotational force in the circumferential direction, said twisting possibly leading to damage to the locking mechanism and hence to a functional unreliability of filler nozzle 13 when filling. This is suppressed by the additional stops described above.

During the docking process, if the end effector 14 is incorrectly positioned relative to docking extension 12 in the circumferential direction, then the tips of the teeth 17 and the toothed segments 22 collide. End effector 14, designed to be flexible in the axial direction, is advanced further by a fixed amount of adjustment against the force of the springs until a shutoff position is reached, when the axial motion of a robot-guided filler nozzle 13 stops. In this shutoff position, filler nozzle 13 is rotated in the circumferential direction until teeth 17, 22 mesh with one another, whereupon end effector 14 is snapped into a meshing engagement with the teeth by the pretensioning of the springs. The end effector, because of teeth 17, 22 meshing with one another, is now locked in the circumferential direction.

End effector 14 is then rotated approximately 15°, with toothed ring 21 turning in the circumferential direction as a result of the positive connection of docking extension 12 with teeth 17 relative to end effector 14. Guide pin 23 moves in guide path 24 of locking body 27 from the locked position 29 into the locked position 28, said body 27 being still completely inserted into end effector 14. At the same time, locking body 27 continues to be pressed further outward by leaf springs 32 until, in locked position 28, the locking body 27 grips beneath teeth 17 forming a circumferential bead of the docking extension 12, whereupon the filler nozzle 13 is locked axially. Filler nozzle 13 is then rotated another 25° in the same direction until swivel slide 7 completely opens inlet channel 8. Then, the filling tube of filler nozzle 13 can be inserted and filling can begin.

After filling the fuel tank, filler nozzle 13 is turned backward until end effector 14 is axially unlocked. Locking body 27 is then forced once again by the teeth of toothed ring 21 that is fixed in the circumferential direction and is also urged radially inward into its inserted position against the force of leaf spring 32 by guide pin 23. Guide pin 23, which continuously prevents locking body 27 from flexing radially outward under the influence of leaf spring 32, is now in its locked position 29.

When emergency undocking occurs, top bevel 43 of locking body 27 abuts the flanks 19 of teeth 17 of docking extension 12. When a certain axial retaining force is exceeded, the leaf spring 32 together with the locking body 27, which slides along the flank 19, is forced radially inward, so that axial locking is immediately released and filler nozzle 13 can be pulled out rapidly from the teeth and hence out of docking extension 12 without any jamming or damage to the filling system.

Another variation on the filling system is shown in the embodiment depicted in FIGS. 4 to 7. In contrast to the first embodiment, guide path 24 is not formed in locking body 27 but rather in a toothed ring 51 that matches toothed ring 21. Guide pin 23 is located at the top, press-fit into a vertical bore 52 in locking body 27. In its disengaged state, it fits beneath teeth 17 over its entire area, since no material needs to be removed for the guide path, thus resulting in an improved fit.

Figure 6:
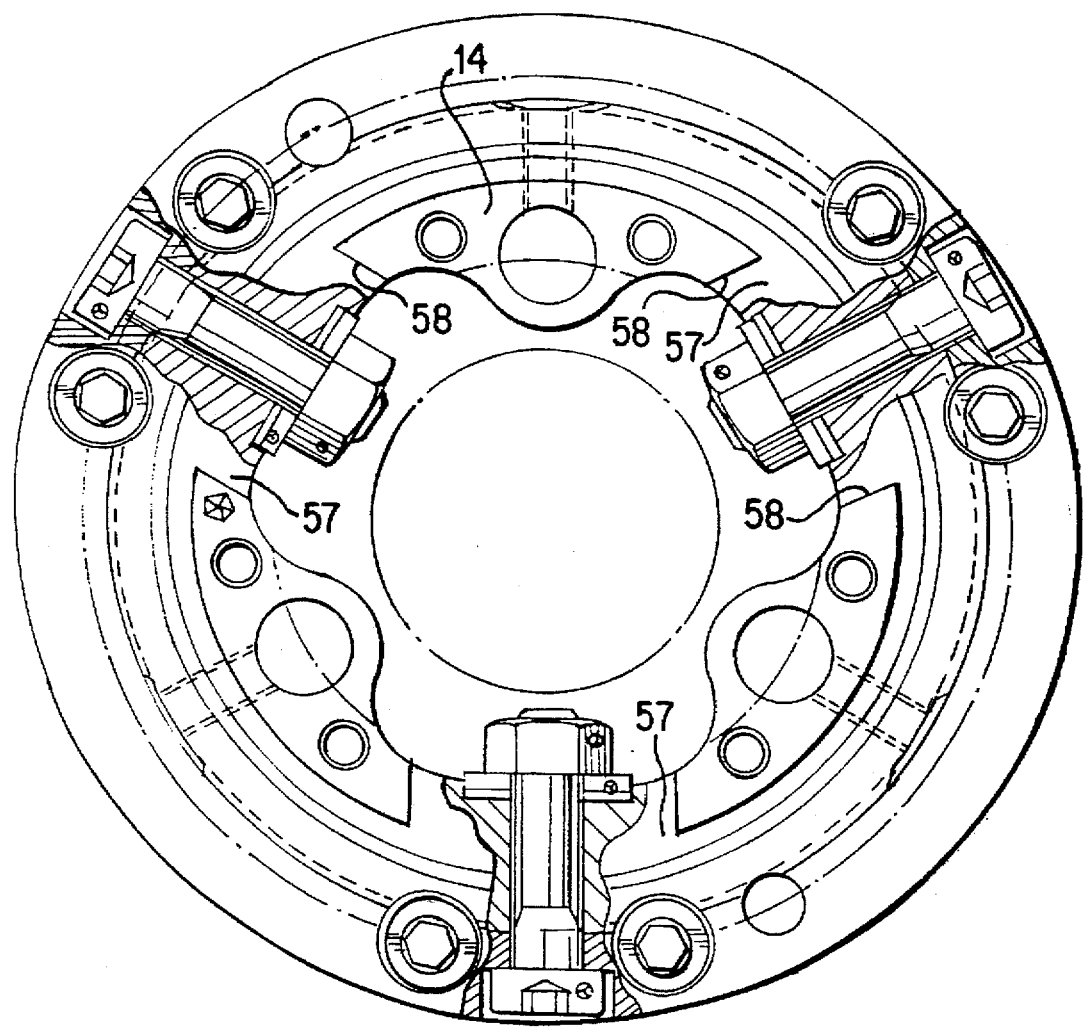
FIG. 6 is a top view of a cross section of the filler nozzle in FIG. 4 in the unlocked position in a section taken along line VI—VI.
Figure 7:
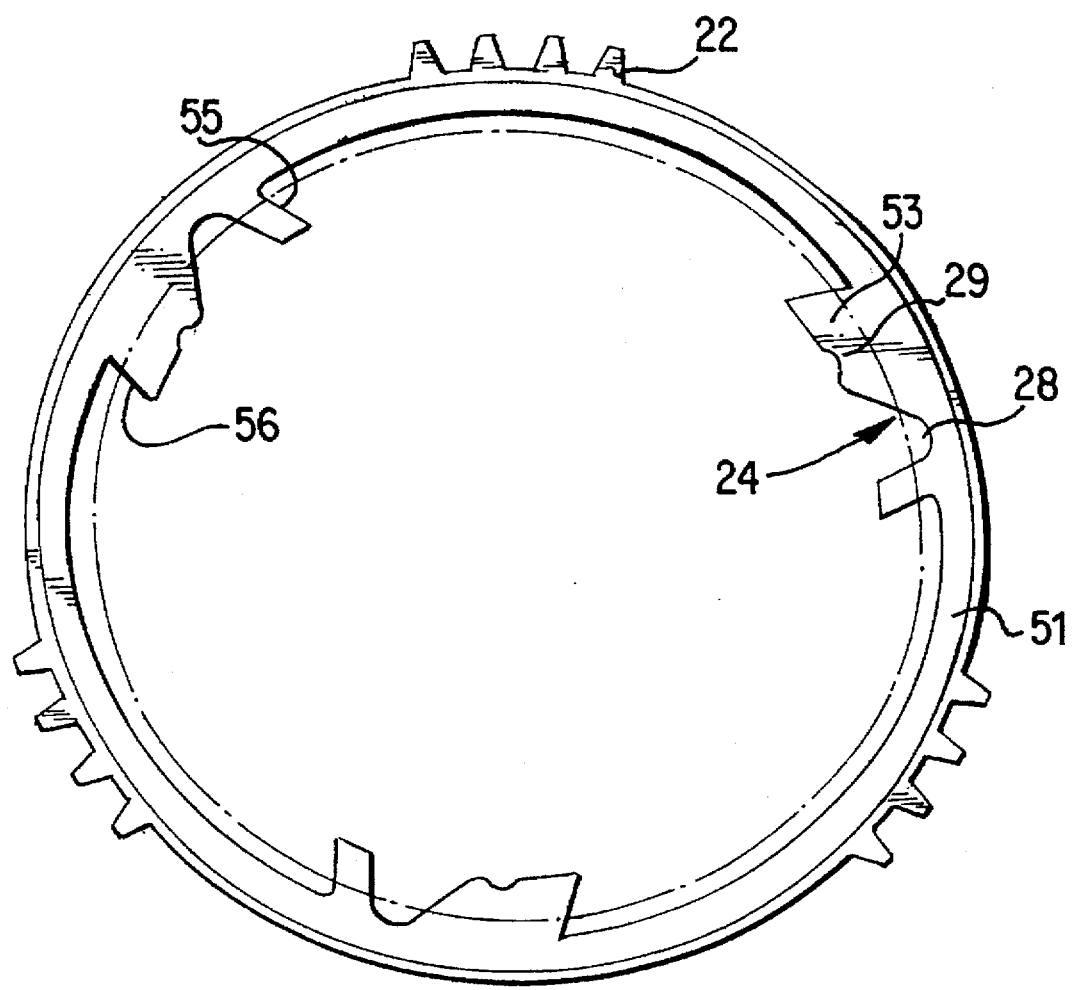
FIG. 7 is a top view of a ring of the filler nozzle, supporting the teeth, in FIG. 4.

Toothed ring 51 has extensions 53 that project radially inward, into which extensions a guide path 24 is machined radially outward from the inside (FIG. 7). Extensions 53 have flanks 55, 56 corresponding to flanks 47, 48 that run diagonally, pointing away from guide path 24, and form stops for end effector 14. The end effector is rotatable relative to toothed ring 51. End effector 14 has openings 57 corresponding to openings 49 through which extensions 53 can pass and whose opening edges 58 form the complementarily shaped counterstops for flanks 55, 56 (FIG. 6).

Figure 5:
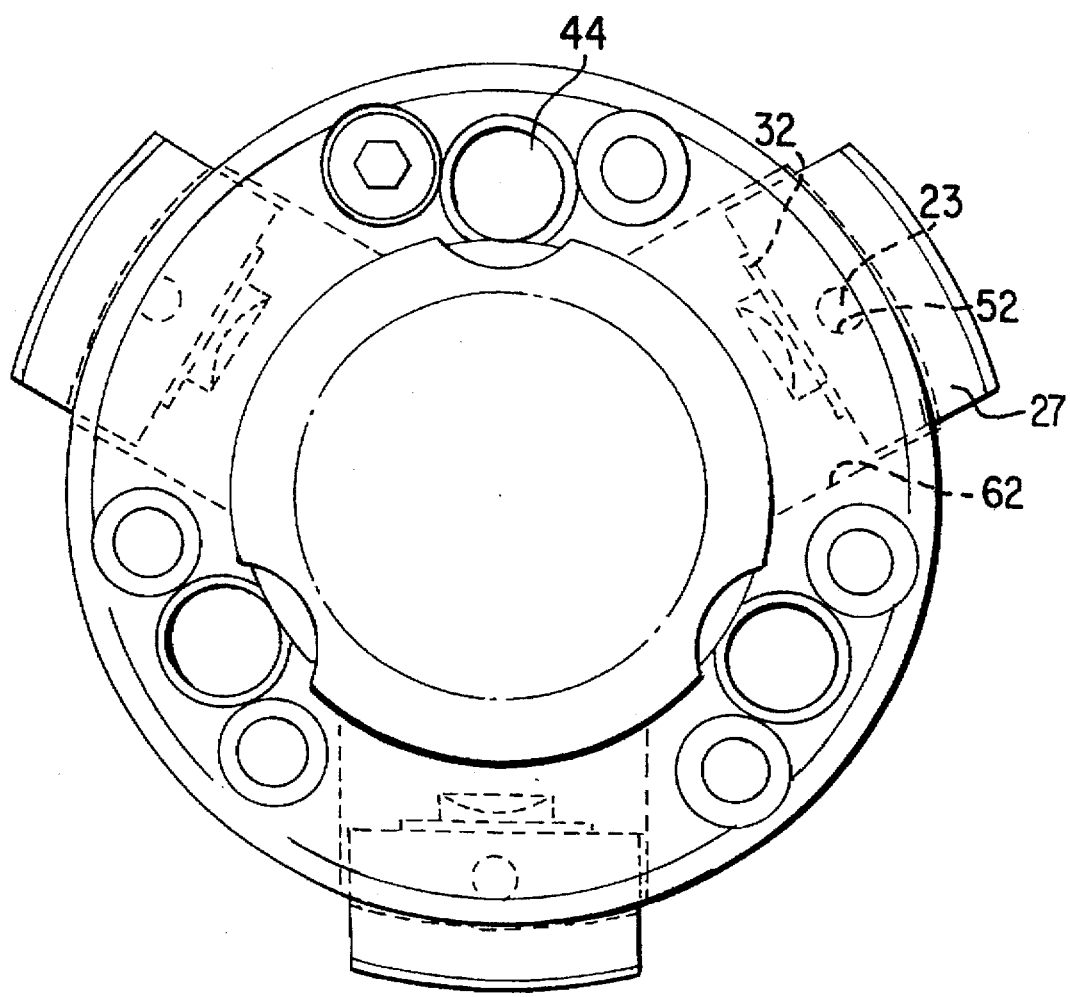
FIG. 5 is a top view of a cross section of the filler nozzle in FIG. 4 in the locked position in a section taken along line V—V.

A retaining sleeve 59 corresponding to retaining sleeve 37 is pushed onto end effector 14. The sleeve 59 however, in contrast to sleeve 37, has a radial recess 62 in the end area of end effector 14 in addition to a through bore 60 that is axial and flush with axial bore 44 to receive sensor optics 61. The locking body 27, urged by leaf spring 32, is guided into the recess (FIG. 5). Retaining sleeve 59, by virtue of its function as the retainer for toothed ring 51, also provides collision protection for locking body 27 when inserted into docking extension 12. Because of its largely closed geometry and the resultant uniform mass distribution, retaining sleeve 59 stabilizes the end area of end effector 14 for insertion into docking extension 12. Its simple disassembly permits easy access to sensor optics 61 and its adjustment.

Figure 4:
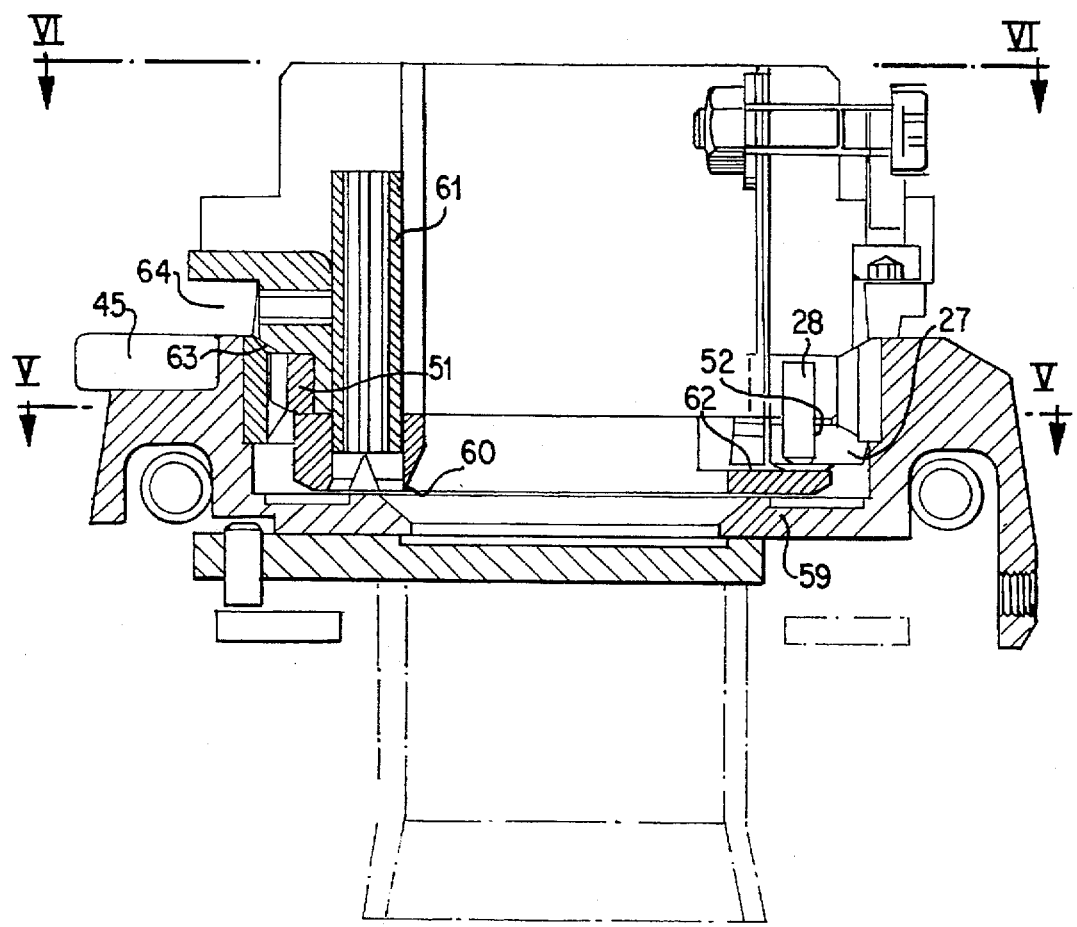
FIG. 4 shows parts of the filling system according to the invention in a lateral lengthwise section, with a locking body provided at the lower end of the filler nozzle and having a guide pin fastened rigidly therein, and with teeth forming the positive element of the filler nozzle, into which a guide path for the pin has been machined, in the unlocked and locked positions of the docked filler nozzle.

FIG. 4 represents locking body 27 in the inserted position by a dashed outline and in the withdrawn position in solid lines, in which position it fits beneath teeth 17 of docking extension 12. End effector 14 also has, above toothed ring 51 and at its outer circumference, a circumferential chamfer 63 by which the end effector 14 rests against the flank 18 of the docking extension 12 in the docked position, so that its end 15 does not rest on top 16 of the annular body 4. Immediately above this chamfer 63, end effector 14 has a sealing ring 64 that rests on docking extension 12 in the docked position and seals end effector 14 off from docking extension 12, so that the efficiency of the gas exhaust at the interface between end effector 14 and docking extension 12 is increased.

The docking and undocking processes as well as emergency undocking proceed in the same fashion as in the first embodiment.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A filling system for an automated fueling of a motor vehicle, comprising:

a filler nozzle;

a filler neck having a docking extension provided with a central opening, said docking extension adapted for being mounted on a filling side of the vehicle and being rotatable via an upper section around an axis of symmetry for operating an opening and closing process of a tank closure of the motor vehicle;

wherein said docking extension has an outlet end which forms a positive connection between the filler nozzle and the docking extension;

locking bodies mounted on said filler nozzle, said locking bodies being radially movable but axially and circumferentially fixed;

a circumferential bead arranged on said docking extension, wherein said locking bodies positively grip beneath said circumferential bead when urged radially outward away from a longitudinal centerline of said filler nozzle, thus securing the filler nozzle in an axial direction; and wherein said locking bodies are movable into a radially retracted position when said filler nozzle is docked and undocked.

2. The filling system according to claim 1, further comprising a spiral guide path arranged in an end effector of said filler nozzle, the radial movement of said locking bodies being along the spiral guide path via a rotational movement of the filler nozzle, said guide path abutting a guide pin fixed radially and in a circumferential direction.

3. The filling system according to claim 2, wherein said filler nozzle includes positive elements, said locking bodies being guided relative to an axially adjacent one of said positive elements along the guide path which runs in the circumferential direction.

4. The filling system according to claim 3, wherein a positive element of said filler nozzle is rotatable relative to said filler nozzle.

5. The filling system according to claim 2, wherein when said guide pin is applied to one end of said guide path, said locking body is completely inserted into said filler nozzle while another end of said guide pin projects radially out of said filler nozzle such that it is arranged beneath the circumferential bead of said docking extension.

6. The filling system according to claim 5, wherein the circumferential bead is formed by a matching positive element of said docking extension with respect to a positive element of said filler nozzle.

7. The filling system according to claim 2, wherein said locking bodies are made in a hammer head shape and are connected at an outer edge with a positive element mounted on an end effector of said filler nozzle via said guide pin which engages said guide path.

8. The filling system according to claim 2, wherein said guide path is machined into a top of said locking bodies, said guide pin being mounted on a positive element of said filler nozzle to engage said guide path.

9. The filling system according to claim 2, wherein said guide path is machined radially inward from an exterior of a positive element of said filler nozzle, said guide pin being fastened to one of said locking bodies to engage said guide path.

10. The filling system according to claim 2, wherein a locked position is provided for said guide pin at one end of said guide path, said locked position being located radially further inward than an initial locked position.

11. The filling system according to claim 1, wherein said locking bodies are urged radially outward via a pretensioning spring.

12. The filling system according to claim 11, wherein said pretensioning spring is a leaf spring aligned parallel to an insertion path of said filler nozzle, said leaf spring having an upper end fastened to an end effector of said filler nozzle.

13. The filling system according to claim 1, wherein said locking bodies have a bevelled surface with a positive pitch which abuts another bevelled surface of the circumferential bead in a radially extended position.

14. The filling system according to claim 1, wherein a positive element of said docking extension is formed by circumferentially arranged teeth located on an inner circumference thereof;
wherein a positive element of said filler nozzle is formed by a toothed ring having toothed segments forming positive elements.

15. The filling system according to claim 1, further comprising a retaining sleeve, said retaining sleeve being slid onto and fastened to an end effector of said filler nozzle, said retaining sleeve axially retaining a positive element pushed onto said end effector on a filler nozzle side.

16. The filling system according to claim 15, wherein said retaining sleeve has a radial recess in an end area of said end effector, said locking bodies being radially guided in said recess.

17. The filling system according to claim 1, further comprising a loop integrated into a circumference of said docking extension and being pivotable 90° into a vertical position for manually opening and closing said fuel tank.

18. The filling system according to claim 1, wherein said docking extension includes a drainage channel running diagonally outward across a bottom portion of said docking extension.

19. The filling system according to claim 1, wherein an end effector of said filler nozzle has axial bores distributed symmetrically about a circumferential direction in order to receive sensor optics.

\* \* \* \* \*